US012444204B2

(12) United States Patent
Hedberg

(10) Patent No.: US 12,444,204 B2
(45) Date of Patent: Oct. 14, 2025

(54) METHOD AND SYSTEM FOR PREDICTING THE PRESENCE OF ENVIRONMENTAL CONDITIONS IN IMAGE DATA

(71) Applicant: ZENUITY AB, Gothenburg (SE)

(72) Inventor: Ognjan Hedberg, Stenungsund (SE)

(73) Assignee: ZENUITY AB, Gothenburg (SE)

( * ) Notice: Subject to any disclaimer, the term of this patent is extended or adjusted under 35 U.S.C. 154(b) by 483 days.

(21) Appl. No.: 17/914,018

(22) PCT Filed: Mar. 31, 2020

(86) PCT No.: PCT/EP2020/059090
§ 371 (c)(1),
(2) Date: Sep. 23, 2022

(87) PCT Pub. No.: WO2021/197584
PCT Pub. Date: Oct. 7, 2021

(65) Prior Publication Data
US 2023/0138969 A1    May 4, 2023

(51) Int. Cl.
*G06V 20/56* (2022.01)
*B60S 1/08* (2006.01)
*G06V 10/94* (2022.01)
*G06V 20/70* (2022.01)

(52) U.S. Cl.
CPC .......... *G06V 20/56* (2022.01); *B60S 1/0844* (2013.01); *G06V 10/95* (2022.01); *G06V 20/70* (2022.01)

(58) Field of Classification Search
CPC ........ G06V 20/56; G06V 20/70; G06V 10/95; B60S 1/0844
See application file for complete search history.

(56) References Cited

U.S. PATENT DOCUMENTS

| 5,412,296 A | 5/1995 | Chien et al. |
| 5,453,676 A | 9/1995 | Agrotis et al. |
| 2014/0265980 A1* | 9/2014 | Kracker ................ G06V 20/56 318/483 |
| 2018/0099646 A1 | 4/2018 | Karandikar et al. |

OTHER PUBLICATIONS

International Search Report and Written Opinion mailed Dec. 18, 2020 for International Application No. PCT/EP2020/059090, 17 pages.
Chi-Cheng Lai et al.; "Video-Based Windshield Rain Detection and Wiper Control Using Holistic-View Deep Learning"; 2019 IEEE 15th International Conference on Automation Science and Engineering (CASE); Aug. 22, 2019; 6 pages.

* cited by examiner

*Primary Examiner* — Casey L Kretzer
(74) *Attorney, Agent, or Firm* — Sage Patent Group

(57) ABSTRACT

The present disclosure relates to methods and systems for generating a trained learning algorithm configured to predict the presence of environmental conditions in image data, a vehicle for utilizing the algorithm, as well as methods and systems for generating the training data for the automated supervised training of a learning algorithm. In some embodiments the training data is in the form of labelled images generated by a camera device arranged on a vehicle, where the labels are indicative of an environmental sensor activation or deactivation signal, or a user-input signal which serve as a supervisory signal for the training of the learning algorithm.

19 Claims, 8 Drawing Sheets

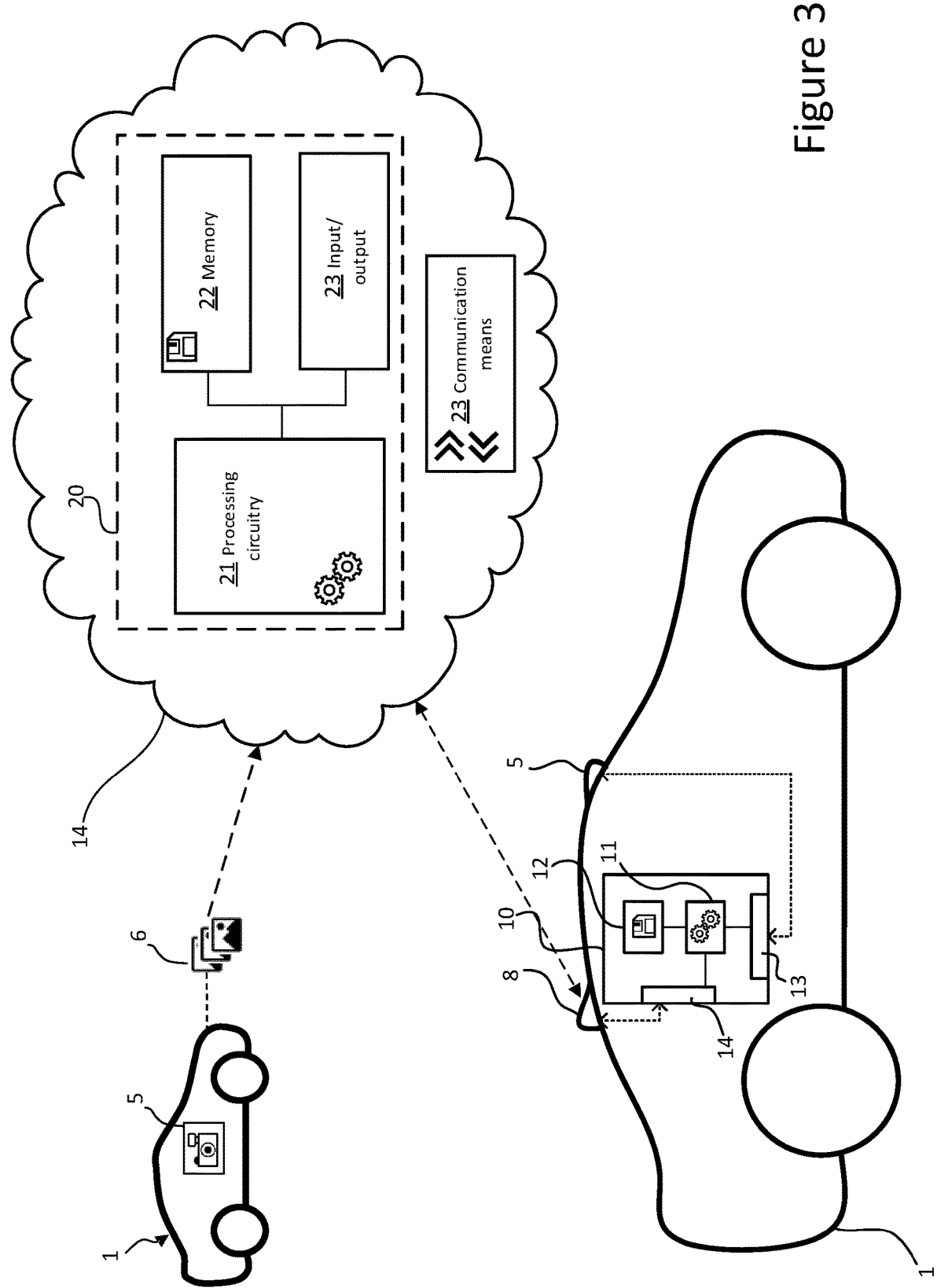

METHOD AND SYSTEM FOR PREDICTING THE PRESENCE OF ENVIRONMENTAL CONDITIONS IN IMAGE DATA

CROSS-REFERENCE TO RELATED APPLICATIONS

This application is a 35 U.S.C § 371 national stage application for International Application No. PCT/EP2020/059090, entitled "METHOD AND SYSTEM FOR PREDICTING THE PRESENCE OF ENVIRONMENTAL CONDITIONS IN IMAGE DATA", filed on Mar. 31, 2020, the disclosures and contents of which are hereby incorporated by reference in their entireties.

TECHNICAL FIELD

The present disclosure relates to methods and systems for generating a trained learning algorithm configured to predict the presence of environmental conditions in image data, a vehicle for utilizing the algorithm, as well as methods and systems for generating the training data for the automated supervised training of a learning algorithm.

BACKGROUND

Today, most of the vehicles have advanced driver assistance systems (ADAS). ADAS systems are developed to enhance vehicle systems for safety and better driving. There exist different categories of ADAS systems such as adaptive, automated, monitoring or warning ADAS systems. There are a variety of different ADAS systems within each category. Rain and light sensing systems are examples of ADAS systems that commonly exist in vehicles today to predict specific environmental conditions.

The rain sensing systems today commonly work by detecting moisture or debris on a vehicle's windshield and automatically actuates the windshield wipers without driver intervention. These systems are programmed to control the rate and speed of windshield wiper blades to maintain the drivers' visibility at all times.

The light sensing systems commonly work by sensors detecting the amount of light coming through the windscreen to for instance automatically activate the headlights if the amount of light is below a threshold.

A common problem with ADAS features directed for predicting environmental conditions in general, and rain and light sensing systems in particular is that a driver isn't able to rely on the corresponding feature with full certainty. Instead, the driver has to manually override (MO) the ADAS system in some situations in order for it to work as intended.

For rain sensor systems, it frequently occurs moments where the rain sensor exhibits a margin of error. Leading to that it detects rain on the windshield of the vehicle too late and/or detects that the windshield of the vehicle is dry too late. Consequently, the windshield wipers of the vehicle are activated or deactivated too early, too late or not at all. This often leads to that the driver manually has to activate the windshield wipers and/or manually has to deactivate the windshield wipers. A similar problem occurs for light sensing systems, where the light sensor exhibits a margin of error, not being activated/deactivated in due time, leading to that the driver manually has to turn off/on certain lights of the vehicle. This can cause situations where the driver will become unwary of the traffic situation or situations where the driver has less vision of the road situation.

Based on the above, there is a need in the art for an improved type of solution that is more reliable than the current solutions. Accordingly, there is a need for a solution for detecting/predicting environmental conditions that eliminates or alleviates the margin of error and the need for a driver to manually override the solution.

SUMMARY

It is therefore an object of the present disclosure to provide methods and systems to train a learning algorithm that detects/predicts the presence of environmental conditions such as rain and/or light, a vehicle utilizing the trained learning algorithm, and a solution for generating the necessary training data for the learning algorithm, which alleviate all or at least some of the drawbacks of presently known solutions.

In more detail, it is an object to provide a method for automated supervised training of a learning algorithm for detecting an environmental condition in a traffic environment, a computer-readable storage medium, a corresponding system, and a vehicle utilizing the trained learning algorithm. It is also an object to provide a method for in-vehicle generation of training data for automated supervised training of a learning algorithm for detecting an environmental condition in a traffic environment, a computer-readable storage medium, a corresponding system, and a vehicle having such a system.

These and other objects are achieved by means of the methods, systems, and vehicles as defined in the appended claims. The term exemplary is in the present context to be understood as serving as an instance, example or illustration.

According to a first aspect of the disclosure there is provided a method for automated supervised training of a learning algorithm for detecting an environmental condition in a traffic environment. The method comprises obtaining image data over a time period from a camera device arranged on at least one vehicle. The image data comprises a plurality of labelled images, where at least one image of the plurality of images being associated with a label indicative of at least one of:

An activation signal outputted by an environmental sensor of the at least one vehicle, the activation signal being indicative of a presence of an environmental condition and arranged to control an operation of a control system of the at least one vehicle.

A deactivation signal outputted by the environmental sensor of the at least one vehicle, the deactivation signal being indicative of an ending of the environmental condition and arranged to control the operation of the control system of the at least one vehicle.

A user-input signal outputted by a user-input device of the at least one vehicle, the user input-signal being indicative of an override of the activation signal or the deactivation signal of the environmental sensor of the at least one vehicle and arranged to control the operation of the control system of the at least one vehicle. The method further comprises training a learning algorithm based on the obtained plurality of labelled images, in order to form a trained learning algorithm configured to detect the presence of the environmental condition in image data.

A benefit of the method is that it allows for building and training a learning algorithm to detect the presence of environmental conditions from image data in an automated supervised way. Supervised learning is in the present context to be understood as a machine learning task where you have input variables and an output variable and you use an algorithm to learn the mapping function from the input to the output. The aim is to approximate the mapping function so that when we have new input data we can predict the output variables for that data. Accordingly, automated supervised learning may be understood as a supervised learning approach where there little to no need for manual annotation or "cleaning" of the data, thereby increasing the speed, efficiency, and scalability of the training method. Moreover, automating the process of applying machine learning end-to-end additionally offers the advantages of producing simpler solutions, faster creation of those solutions, and models that often outperform hand-designed models.

In more detail, in a typical machine learning application, practitioners have a dataset consisting of input data points to train on. The raw data itself may not be in a form so that all algorithms may be applicable to it out of the box. An expert may have to apply appropriate data pre-processing, feature engineering, feature extraction, and feature selection methods that make the dataset amenable for machine learning. Following those pre-processing steps, practitioners must then perform algorithm selection and hyper parameter optimization to maximize the predictive performance of their machine learning model. Clearly all of those steps induce their own challenges, accumulating to a significant hurdle to get started with machine learning.

Further, the above proposed method allows for training/development and validation of a camera-based environmental condition detecting system which is based on data gathered from dedicated environmental sensors and also user-input signals. Consequently, the method may overtime get better and become superior to systems based on only conventional environmental sensors. Further, the camera could eventually replace the environmental sensors, resulting in a cheaper production cost and faster assembly of the vehicle. Moreover, since the learning method is automated it also provides the benefit of being more scalable as compared to other conventional solutions.

The step of training may further comprise defining labels indicative of the user input signal as a supervisory signal having a higher confidence value than labels indicative of the activation signal and labels indicative of the deactivation signal. A benefit of this is that the method may differentiate between different type of signals (signals from users and signals from sensors) and choose to define labels of one signal as having a higher confidence than the other. Higher confidence is in the present context to be understood as that the data is a more certain indication of a presence of the environmental condition. Thus, labels indicative of user input signals which can be regarded to be more authentic compared to labels indicative of sensor signals may have a higher confidence value. Accordingly, the trained learning algorithm may be trained to predict the presence of environmental conditions better than a traditional rain sensor.

Further, the environmental sensor may be a rain sensor and the environmental condition may be rain, and the control system may comprise an actuator device for actuating at least one windshield wiper apparatus of the at least one vehicle.

Accordingly, in some embodiments the user-input signal may comprise at least one of: a first signal indicative of an activation of the windshield wiper apparatus of the at least one vehicle, a second signal indicative of a deactivation of the windshield wiper apparatus of the at least one vehicle, a third signal indicative of an increase of a sensitivity of the rain sensor, and a fourth signal indicative of a decrease of the sensitivity of the rain sensor.

The method may further comprise the step of transmitting the trained learning algorithm to a plurality of vehicles, each vehicle having a camera device, wherein the trained learning algorithm is arranged to control the operation of the control system of each vehicle based on a predicted presence of the environmental condition in image data obtained from the camera device of each vehicle. In other words, once the learning algorithm is trained above a certain integrity level, it may be deployed in a fleet of vehicles. Thus, a benefit of this is that the trained learning algorithm may be implemented in a plurality of vehicles allowing for dedicated environmental sensors to be disregarded in the future production of vehicles, since the detection of the environmental condition can now be solely camera based.

According to another aspect of the disclosure there is provided a (non-transitory) computer-readable storage medium storing one or more programs configured to be executed by one or more processors of a processing system, the one or more programs comprising instructions for performing the method for automated supervised training of a learning algorithm for detecting an environmental condition in a traffic environment. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to yet another aspect of the disclosure there is provided a system for automated supervised training of a learning algorithm for detecting an environmental condition in a traffic environment. The system comprises control circuitry configured to obtain image data over a time period from a camera device arranged on at least one vehicle. The image data comprises a plurality of labelled images, at least one image of the plurality of images being associated with a label indicative of at least one of:

An activation signal outputted by an environmental sensor of the at least one vehicle, the activation signal being indicative of a presence of an environmental condition and arranged to control an operation of a control system of the at least one vehicle.

A deactivation signal outputted by the environmental sensor of the at least one vehicle, the deactivation signal being indicative of an ending of the environmental condition and arranged to control the operation of the control system of the at least one vehicle.

A user-input signal outputted by a user-input device of the at least one vehicle, the user input-signal being indicative of an override of the activation signal or the deactivation signal of the environmental sensor of the at least one vehicle and arranged to control the operation of the control system of the at least one vehicle. The control circuitry is further configured to train a learning algorithm based on the obtained plurality of labelled images, in order to form a trained learning algorithm configured to detect the presence of the environmental condition in image data. With this aspect of the disclosure, similar advantages and preferred features are present as in the previously discussed aspects of the disclosure.

The control circuitry may be configured to define labels indicative of the user input signal as a supervisory signal having a higher confidence value than labels indicative of the activation signal and labels indicative of the deactivation signal when training the learning algorithm.

According to yet another aspect of the disclosure there is provided a vehicle comprising a camera device arranged to capture a plurality of images of a surrounding environment of the vehicle, each image depicting a presence or non-presence of an environmental condition. The vehicle further comprises control circuitry configured to receive the trained learning algorithm trained according to the method for automated supervised training of a learning algorithm for detecting an environmental condition in a traffic environment according to any one of the embodiments disclosed herein. The control circuitry is further configured to analyse, by means of the trained learning algorithm, the plurality of images captured by the camera device, and to determine, by means of the trained learning algorithm, a presence of the environmental condition in the plurality of images captured by the camera device of each vehicle. Moreover, the control circuitry is configured to generate, at an output, a control signal for controlling the operation of the control system of the vehicle based on the determined presence of the environmental condition in the plurality of images. With this aspect of the disclosure, similar advantages and preferred features are present as in the previously discussed aspects of the disclosure.

According to yet another aspect of the disclosure there is provided a method for in-vehicle generation of training data for automated supervised training of a learning algorithm for detecting an environmental condition in a traffic environment. The method comprises obtaining image data over a time period from a camera device arranged on a vehicle. The image data comprises a plurality of images of a surrounding environment of the vehicle over the time period. The method further comprises obtaining a first signal indicative of an activation signal outputted by an environmental sensor of the vehicle during the time period, the activation signal being indicative of a presence of an environmental condition and arranged to control an operation of a control system of the vehicle. Moreover, the method comprises obtaining a second signal indicative of a deactivation signal outputted by the environmental sensor of the vehicle during the time period, the deactivation signal being indicative of an ending of the environmental condition and arranged to control the operation of the control system of the vehicle. Further, the method comprises obtaining a third signal indicative of a user-input signal outputted by a user-input device of the vehicle during the time period, the user input-signal being indicative of an override of the activation signal or the deactivation signal of the environmental sensor of the at least one vehicle and arranged to control the operation of the control system of the at least one vehicle. The method further comprises labelling at least one of the plurality of images based on a timing of the activation signal, deactivation signal, and the user-input signal over the time period, and transmitting the plurality of images to a remote entity, the plurality of images forming training data for the learning algorithm configured to detect the presence of the environmental condition in image data. With this aspect of the disclosure, similar advantages and preferred features are present as in the previously discussed aspects of the disclosure.

The environmental sensor may be a rain sensor and the environmental condition may be rain, and the control system may comprise an actuator device for actuating at least one windshield wiper apparatus of the at least one vehicle.

Accordingly, the user-input signal may comprise at least one of: a first user-input signal indicative of an activation of the windshield wiper apparatus of the at least one vehicle; a second user-input signal indicative of an deactivation of the windshield wiper apparatus of the at least one vehicle; a third user-input signal indicative of an increase of a sensitivity of the rain sensor; and a fourth user-input signal indicative of a decrease of the sensitivity of the rain sensor.

According to yet another aspect of the disclosure there is provided a (non-transitory) computer-readable storage medium storing one or more programs configured to be executed by one or more processors of a vehicle control system, the one or more programs comprising instructions for performing the method for in-vehicle generation of training data for automated supervised training of a learning algorithm for detecting an environmental condition in a traffic environment according to any one of the embodiments disclosed herein. With this aspect of the disclosure, similar advantages and preferred features are present as in the previously discussed aspects of the disclosure.

According to yet another aspect of the disclosure there is provided a system for in-vehicle generation of training data for automated supervised training of a learning algorithm for detecting an environmental condition in a traffic environment. The system comprises control circuitry configured to obtain image data over a time period from a camera device arranged on a vehicle, where the image data comprises a plurality of images of a surrounding environment of the vehicle over the time period. The control circuitry is configured to obtain a first signal indicative of an activation signal outputted by an environmental sensor of the vehicle during the time period, the activation signal being indicative of a presence of an environmental condition and arranged to control an operation of a control system of the vehicle. The control circuitry is further configured to obtain a second signal indicative of a deactivation signal outputted by the environmental sensor of the vehicle during the time period, the deactivation signal being indicative of an ending of the environmental condition and arranged to control the operation of the control system of the vehicle. Furthermore, the control circuitry is configured to obtain a third signal indicative of a user-input signal outputted by a user-input device of the vehicle during the time period, the user input-signal being indicative of an override of the activation signal or the deactivation signal of the environmental sensor of the at least one vehicle and arranged to control the operation of the control system of the at least one vehicle. Moreover, the control circuitry is configured to label at least one of the plurality of images based on a timing of the activation signal, deactivation signal, and the user-input signal over the time period, and to transmit the plurality of images to a remote entity, the plurality of images forming training data for a learning algorithm configured to detect the presence of the environmental condition in image data. With this aspect of the disclosure, similar advantages and preferred features are present as in the previously discussed aspects of the disclosure.

According to yet another aspect of the disclosure there is provided a vehicle comprising a camera device arranged to generate a plurality of images of a surrounding environment of the vehicle over a time period, an environmental sensor configured to detect a presence of an environmental condition and to generate an activation signal and a deactivation signal to a control system of the vehicle, and a user-input device configured to generate a user-input signal to the control system of the vehicle. The vehicle further comprises control circuitry configured to: label at least one of the plurality of images based on a timing of the activation signal, deactivation signal, and the user-input signal over the time period; transmit the plurality of images to a remote entity, the plurality of images forming training data for a learning algorithm configured to detect the presence of the environmental condition in image data. With this aspect of the disclosure, similar advantages and preferred features are present as in the previously discussed aspects of the disclosure.

In other words, there is provided a vehicle comprising a camera device arranged to generate a plurality of images of a surrounding environment of the vehicle over a time period, an environmental sensor configured to detect a presence of an environmental condition and to generate an activation signal and a deactivation signal to a control system of the vehicle, and a user-input device configured to generate a user-input signal to the control system of the vehicle. The vehicle further comprises a system for in-vehicle generation of training data for automated supervised training of a learning algorithm for detecting an environmental condition in a traffic environment according to any one of the embodiments disclosed herein.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which:

FIG. 3 schematically depicts system for automated supervised training of a learning algorithm for detecting an environmental condition in a traffic environment in accordance with an embodiment of the present disclosure.

DETAILED DESCRIPTION

Figure 1:
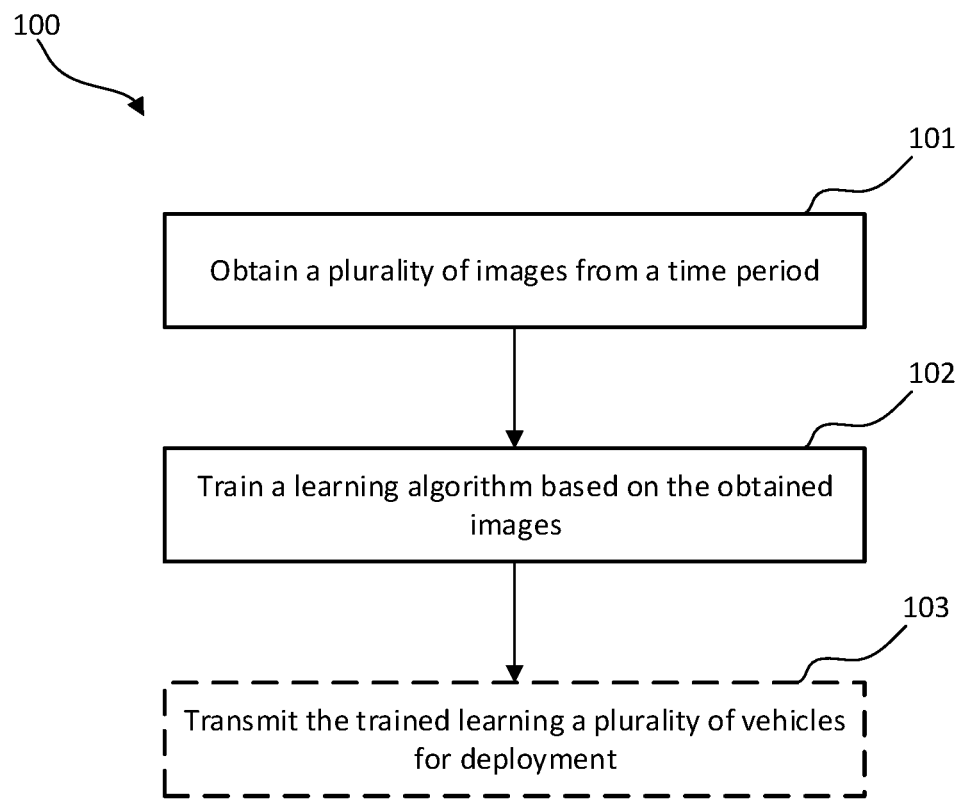
FIG. 1 is a schematic flow chart representation of a method for automated supervised training of a learning algorithm for detecting an environmental condition in a traffic environment in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Even though the following disclosure mainly discusses vehicles in the form of cars, the skilled reader readily realizes that the teachings discussed herein are applicable to other forms of vehicles such as trucks, buses and construction equipment.

FIG. 1 depicts a schematic chart that illustrates a method 100 comprising obtaining 101 image data over a time period from a camera device arranged on at least one vehicle. The image data comprises a plurality of labelled images, at least one image of the plurality of images being associated with a label indicative of at least one of:

An activation signal outputted by an environmental sensor of the at least one vehicle. The activation signal being indicative of a presence of an environmental condition and arranged to control an operation of a control system of the at least one vehicle.

A deactivation signal outputted by the environmental sensor of the at least one vehicle. The deactivation signal being indicative of an ending of the environmental condition and arranged to control the operation of the control system of the at least one vehicle.

A user-input signal outputted by a user-input device of the at least one vehicle. The user input-signal is indicative of an override of the activation signal or the deactivation signal of the environmental sensor of the at least one vehicle and arranged to control the operation of the control system of the at least one vehicle.

However, preferably, the plurality of images comprises a set of images having all of the above-mentioned labels. In other words, all of the above-mentioned labels are represented in the plurality of images, at least in one image each.

The method 100 further comprises the step of training 102 a learning algorithm based on the obtained plurality of labelled images, in order to form a trained learning algorithm configured to detect the presence of the environmental condition in image data. In other words, once the learning algorithm is trained it is configured to detect a presence of the environmental condition in an arbitrarily selected image or series of images.

The term "activation signal" refers to a signal that initiates an activation of a specific operation within the control system of a vehicle. The activation signal as disclosed herein is triggered by an output of the environmental sensor. For instance, the activation signal may actuate the windshield wipers of the vehicle. Accordingly, in such a case, the output of the environmental sensor (i.e. rain sensor) is the detection of rain on the windshield of the vehicle.

The term "deactivation signal" refers to a signal that initiates the deactivation of a specific operation within the control system of a vehicle. The deactivation signal as disclosed herein is also triggered by an output of the environmental sensor. Going along with the above example, the deactivation signal may stop the actuation of the windshield wipers of the vehicle. Accordingly, in such a case, the output of the environmental sensor (i.e. rain sensor) is the detection of an absence of rain (i.e. a no-rain-condition) on the windshield of the vehicle.

The term "override" or "manual override" or "MO" refers to when there is manual control is overtaken from an automated function or system. If the environmental sensor is a rain sensor, and the environmental condition is rain, then the user input signal may accordingly be a manual activation/deactivation of the windshield wipers (e.g. by means of a lever arranged on the steering column). It should be noted that an "override" does not necessarily mean that the user input signal is "reactive" to the environmental sensor's signal, but also encompasses scenarios where the environmental sensor hasn't detected a change in the environmental condition and the user merely activates/deactivates the control system of the vehicle. The user activation/deactivation may also be momentary, e.g. just a single actuation of the windshield wipers due to a small amount of water (below a threshold of the rain sensor) being present on the windshield.

Moreover, the method 100 may further comprise the step of transmitting 103 the trained learning algorithm to a plurality of vehicles, each vehicle having a camera device, wherein the trained learning algorithm is arranged to control the operation of the control system of each vehicle based on a predicted presence of the environmental condition in image data obtained from the camera device of each vehicle.

The method 100 as depicted in FIG. 1 discloses an automated supervised training of a learning algorithm for detecting an environmental condition in a traffic environment through image data. Moreover, the method 100 is suitable for use in autonomous driving applications. The term "autonomous driving application," as used herein, is applicable to vehicles that operate at Level 1, Level 2, Level 3, Level 4, or Level 5 of SAE (Society of Automotive Engineers) International Standard J3016. As such, the term "autonomous," as used herein, generally may be interpreted as "fully-autonomous and/or partially-autonomous" and/or as "entirely self-driving and/or partially self-driving". The term "predict" or "detect" as used herein may refer to determining or detecting the presence of an environmental condition in image data. The term "image data" may refer to at least one image captured by a camera device. According to some embodiments, image data may comprise a series of images forming a motion, such as a video. Further, the trained learning algorithm may be trained by distinguishing/analysing the colour and/or texture and/or shapes of pixels in an image as such or in different areas of an image, as known in the art of image recognition techniques.

In summary, method 100 provides for a means to execute an automated supervised training of a learning algorithm based on a labelled/tagged input in the form image data. This means that the image data is labelled/tagged with a 'correct' answer (in an automated manner), being the presence of one or more environmental conditions. For example, each image may be tagged/labelled according to whether the image is associated with e.g. a rain condition. More specifically, each image is labelled based on signals outputted by an environmental sensor (configured to monitor for the presence of the environmental condition in the surrounding environment of the vehicle) and a signal outputted by a user device indicative of an override of the environmental sensor. These signals may for example be obtained from a vehicle-mounted rain sensor and a manual actuation of the windshield wipers of the vehicle.

Moreover, the trained learning algorithm learns from the labelled training data, which allows the learning algorithm to build, scale and to eventually be deployed in a vehicle to predict/detect outcomes of unforeseen data. Accordingly, the training algorithm will be able to model relationships and dependencies between the labelled input data such that it is able to predict output for new data based on the relationships and dependencies which is learned from previous input data.

Thus, when the learning algorithm is trained and deployed in a vehicle. It will, based on the captured image data from the camera device of the vehicle, be trained to be able to detect/determine the current environmental condition in the traffic environment of the vehicle. Further, the vehicle may be configured to activate/deactivate specific features (such as its windshield wipers, if the detected environmental condition is rain) based on the detected/determined environmental condition. It should be noted that the automated supervised training algorithm as proposed herein results in that there is a reduced or even no need for manual annotation or "cleaning" of the data, allowing for the learning algorithm to be trained and scaled to a low cost.

The learning algorithm may be based on a binary classification model—labelling two possible outcomes of the image data such as for instance: rain/no rain. However, the learning algorithm may also be multi-labelled such that it labels possible outcomes such as "rain within a first and a second threshold value", "rain within a second and a third threshold value" etc. Also the learning algorithm may label such that it labels possible outcomes involving several environmental conditions such as "rain and day-light", "no rain and night-light", "rain and night-light" etc.

Moreover, according to some embodiments, at least one of the plurality of images may be further associated with a label indicative of at least one of:

A control setting change outputted by an environmental sensor of the at least one vehicle, the control setting change being indicative of a change of a presence of an environmental condition.

A control setting change outputted by a user input device of the at least one vehicle, the control setting change being indicative of a change of a presence of an environmental condition.

Thus, the trained learning algorithm may be further configured to detect the change of a presence of an environmental condition in image data.

In more detail, the environmental condition may for example be rain, the environmental sensor may be a rain sensor, and the control system may comprise an actuator device for actuating at least one windshield wiper apparatus of the vehicle. Accordingly, the control setting change may be a change in the speed of the windshield wipers, such as an increase in the speed of the windshield wipers or a decrease in the speed of the windshield wipers. Thus, the training algorithm may further be trained to control the speed of the windshield wipers to adapt to the amount of rain that is pouring on the windshield wipers or the amount of rain that is present on the windshield of the vehicle. Another example of a control setting change is the adjustment of illumination strength and/or lighting of the vehicle in dependence of the lighting levels outside of the vehicle (e.g. driving in bright daylight conditions, driving in cloudy conditions, driving during dawn, driving during night, driving through a tunnel, etc.).

Executable instructions for performing these functions are, optionally, included in a non-transitory computer-readable storage medium or other computer program product configured for execution by one or more processors.

Figure 2A:
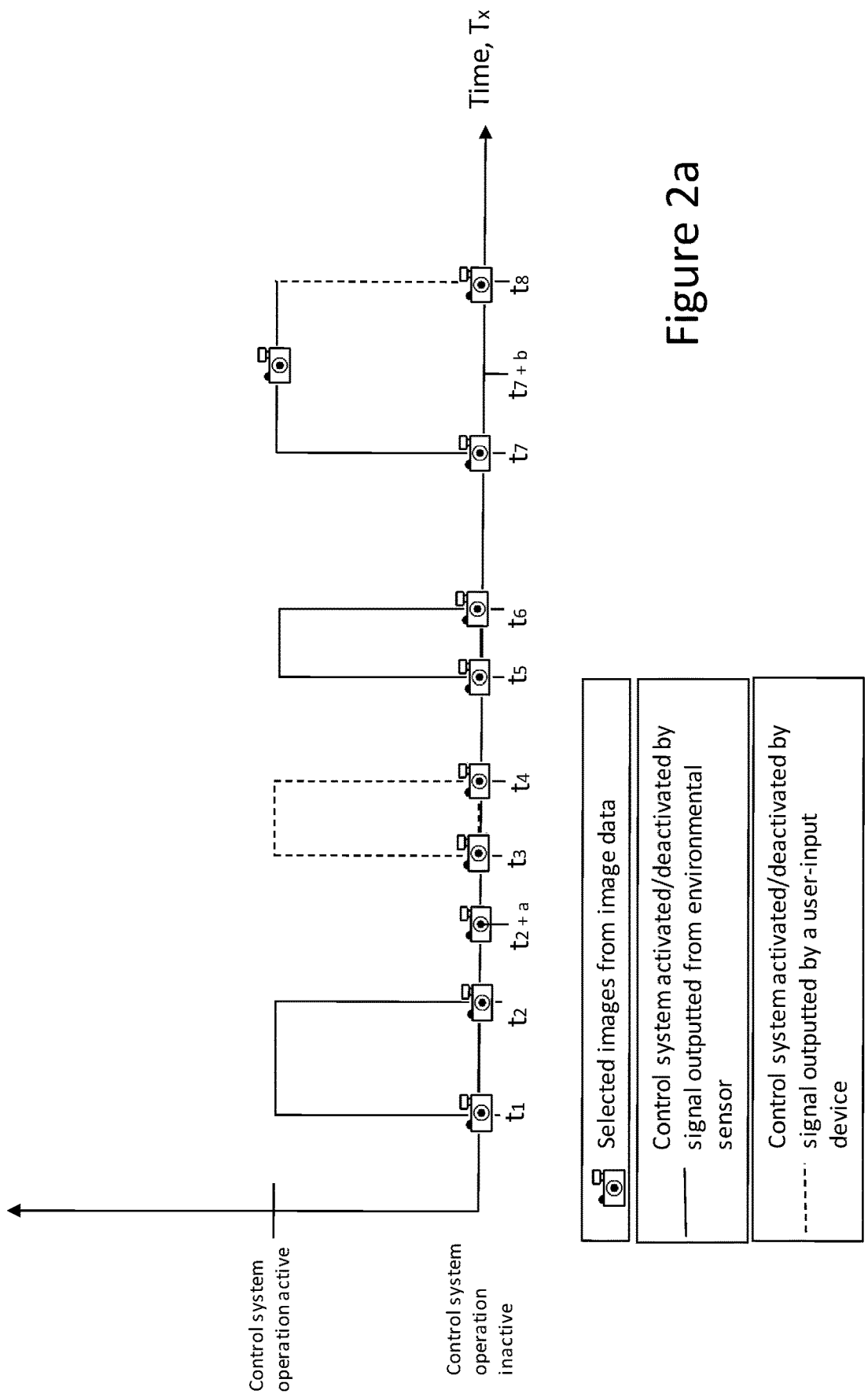
FIG. 2a depicts a schematic graph illustrating the capturing of image data during activation or deactivation of a control system within a time period in accordance with an embodiment of the present disclosure.

In accordance with the above, FIG. 2a depicts the controlling of the control system of a vehicle over a time period Tx. In more detail, the control of the control system of the vehicle is based on an environmental sensor configured to detect the presence of an environmental condition and a manual override of a user that has detected the presence of the environmental condition (or is unsatisfied with the operation of the environmental sensor).

Further, FIG. 2a illustrates events of deactivation or activation of a control system within a time period $T_x$ where a camera captures image data during specific time periods. As illustrated in FIG. 2a, the camera captures image data at least during every event where the control system is activated or deactivated. Preferably, the camera captures image data in the form of a plurality of images for each event, examples of events are shown in $t_1$-$t_8$ in FIG. 2a. However, the camera may be arranged to capture images during the whole time period $T_x$, but that only a subset of all of the captured images are selected to serve as training data for the learning algorithm. In particular, one may select images close in time (just before, and after) every event where the control system is activated or deactivated, as well as some images during a steady state, i.e. between the activations/deactivations the control system.

The images captured in FIG. 2a may further be associated with a label being indicative of an activation signal, outputted by an environmental sensor, being indicative of a presence of an environmental condition, a deactivation signal, outputted by the environmental sensor, being indicative of an ending of the environmental condition, user input-signal being indicative of an manual activation or deactivation of the control system. In other words, the images captured in FIG. 2a may serve as input training data for the learning algorithm.

Further, at the times $t_1$, $t_2$, and the times $t_5$, $t_6$ the control system is activated and deactivated by a signal from the environmental sensor. However, between time $t_3$ and $t_4$ the control system is activated and deactivated by a signal outputted by the user-input device. In $t_7$, the control system is activated by a signal outputted by the environmental sensor and in $t_8$, the control system is deactivated by a signal outputted by the user-input device. Thus, FIG. 2a illustrates that the camera will capture image data at least for every time the control system is activated and deactivated, or alternatively, that at least images associated with every time the control system is activated and deactivated are stored in a memory associated with the camera. The stored images may subsequently be sent to a central entity comprising a processing system configured to train the learning algorithm.

Further, the images may further be associated with a label indicative of a "relax" state. The relax state may be defined as a state where the image data captured by the camera is not associated with a timing when the control system is either activated or deactivated. An example of captured image data in a relaxed state is seen in $t_{2+a}$ and $t_{7+b}$ in FIG. 2a. As mentioned, it should be noted that the camera device of the vehicle may be operating during the whole time Tx even though only image data associated with specific timings is stored for subsequent processing. For example, one may employ a buffer of a few seconds (e.g. 1-5 seconds) storing images around each "event" and potentially around arbitrarily selected points in time representative of the "relax" state.

In other words, the camera device of the vehicle may be configured to capture images continuously (e.g. as a video feed) during the time period $T_x$ whereupon specific images from the full time period are subsequently selected (e.g. by a sorting/selection algorithm that may be rule based). For example, the sorting algorithm or selection algorithm may be configured to select a plurality of images around the point in time associated with an activation or deactivation of the control system, i.e. around $t_1$, $t_2$, $t_3$, $t_4$, $t_5$, $t_6$, $t_7$, and $t_8$, as well as some sample images from arbitrarily selected points in time such as e.g. $t_{2+a}$, and $t_{7+b}$. In that way the learning algorithm will be provided with image data indicative of the transitions to and from the environmental condition as well as image data indicative of a "steady state" presence/non-presence of the environmental condition.

Furthermore, the training may comprise defining labels indicative of the user input signal as a supervisory signal having a higher confidence value than labels indicative of the activation signal and labels indicative of the deactivation signal. In other words, the training of the learning algorithm may train the learning algorithm to treat the labels indicative of the user input signal (i.e. signals generated by a manual override of the control system) as more correct compared to the labels indicative of the environmental signal (i.e. the signal outputted by the environmental sensor). For instance, during the time of $t_3$, $t_4$ and $t_8$ in FIG. 2a, the environmental signal has not activated or deactivated the control system. Rather, during $t_3$, $t_4$ and $t_8$, the user input device (which may be operated by e.g. a driver of the vehicle) has activated/deactivated the control system. Thus, if there will occur a future scenario where the environmental sensor choses to deactivate the control system and the captured image data is identical to the image data captured in (for instance) $t_3$ in FIG. 2a, then the learning algorithm will be trained to assume that the control system should not be deactivated in that scenario, based on that a user input signal activated the control system during a similar/identical situation (i.e. the user input signal activated the control system in $t_3$). In other words, the learning algorithm is trained to treat the user input signal as a signal that with more certainty determines the environmental condition of the traffic environment of the vehicle compared to signals outputted by the environmental sensor.

Accordingly, the algorithm may be trained to assume that the user input signal which is controlled by a driver of a vehicle is superior (i.e. more correct) compared to the environmental sensor signal. This in turn leads to that the algorithm will be trained to be controlled according to how a user/driver of the vehicle would control the control system which further results in a more convenient user/driving experience for a user of the vehicle.

In accordance with some embodiments, the environmental sensor may be rain sensor, the environmental condition may be rain, and the control system may comprise an actuator device (which may be in the form of a windshield wiper motor) for actuating at least one windshield wiper apparatus of the at least one vehicle. This is illustrated in FIG. 2b, where there is shown a vehicle 1 during the time $t_1$ and $t_2$, which may be understood as corresponding to the points in time $t_1$ and $t_2$ from FIG. 2a.

Figure 2B:
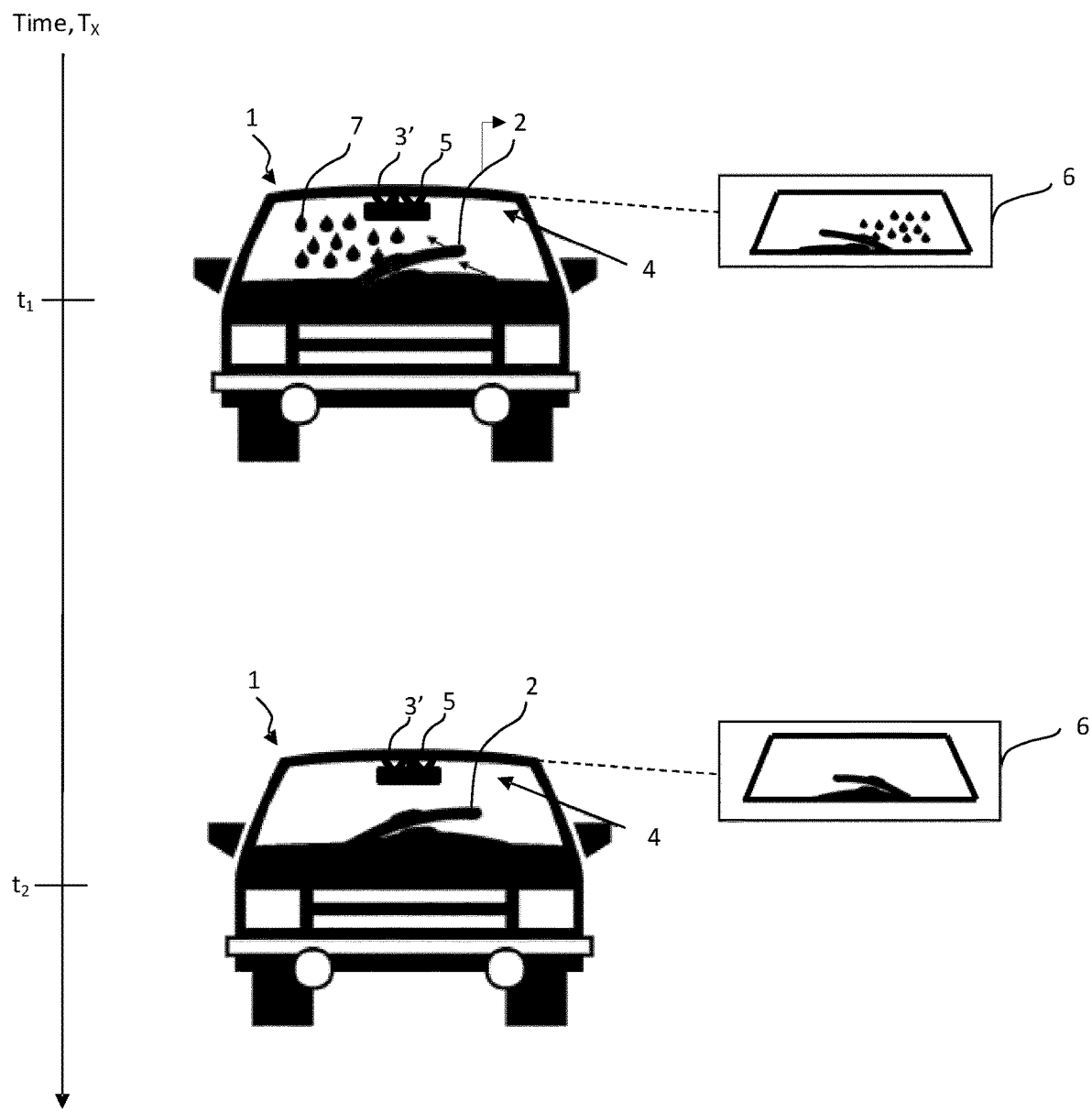
FIG. 2b depicts the time periods $t_1$ and $t_2$ from FIG. 2a according to one embodiment of the present disclosure where the environmental sensor is a rain sensor.

During $t_1$ in FIG. 2b, at least one windshield wiper 2 is actuated since the rain sensor 3' has detected rain 7 on the windshield 4 of the vehicle 1. Further, as seen in FIG. 2b the camera device 5 captures at least one image 6 of the windshield 4 at the time the rain sensor 3' detects rain 7 on the windshield 4 of the vehicle 1. During $t_2$ in FIG. 2b, the rain sensor 3' has outputted a deactivation signal since it doesn't detect any rain 7 any longer on the windshield of the vehicle 1. Thus the windshield wiper 2 at the time $t_2$ is deactivated. Further, in accordance with the above discussed method, the camera device 5 captures at least one image 6 of the windshield 4 of the vehicle 1 during the time $t_2$. As previously mentioned, preferably a plurality of images around the times $t_1$ and $t_2$ are captured and stored (in an associated memory device acting as a buffer) for subsequent processing.

The term "windshield wiper" may be any form of windshield wiper for vehicles. Such as mechanical wipers, air blade wipers or any other type of windshield wipers. The windshield wipers may comprise wiper arms, links interconnecting the wiper arms, a wiper motor and a motor arm connected to the wiper motor and the links.

Accordingly, the user-input signal may comprise at least one of:
A first signal indicative of a manual activation of the windshield wiper apparatus of the at least one vehicle.
A second signal indicative of a manual deactivation of the windshield wiper apparatus of the at least one vehicle 1.
A third signal indicative of an increase of a sensitivity of the rain sensor 3'.
A fourth signal indicative of a decrease of the sensitivity of the rain sensor 3'.

The increase/decrease of the sensitivity of the rain sensor 3' may be performed manually by the driver as a result of that the driver perceives that the sensors work incorrectly, hence, such measures may also count as user-input signals.

In accordance with some embodiments, the environmental sensor may also be in the form of a light sensor configured to monitor the lighting conditions in the surrounding environment of the vehicle, wherefore the environmental condition may be light or dark. This is further illustrated in FIG. 2c. Accordingly, the control system of the vehicle 1 may be in the form of a lighting control system. In more detail, in response to detecting if it is light or dark, the external lights (e.g. headlights) of the vehicle and the illumination strength of Human-Machine Interfaces (HMIs) in the vehicle 1 may be controlled.

Figure 2C:
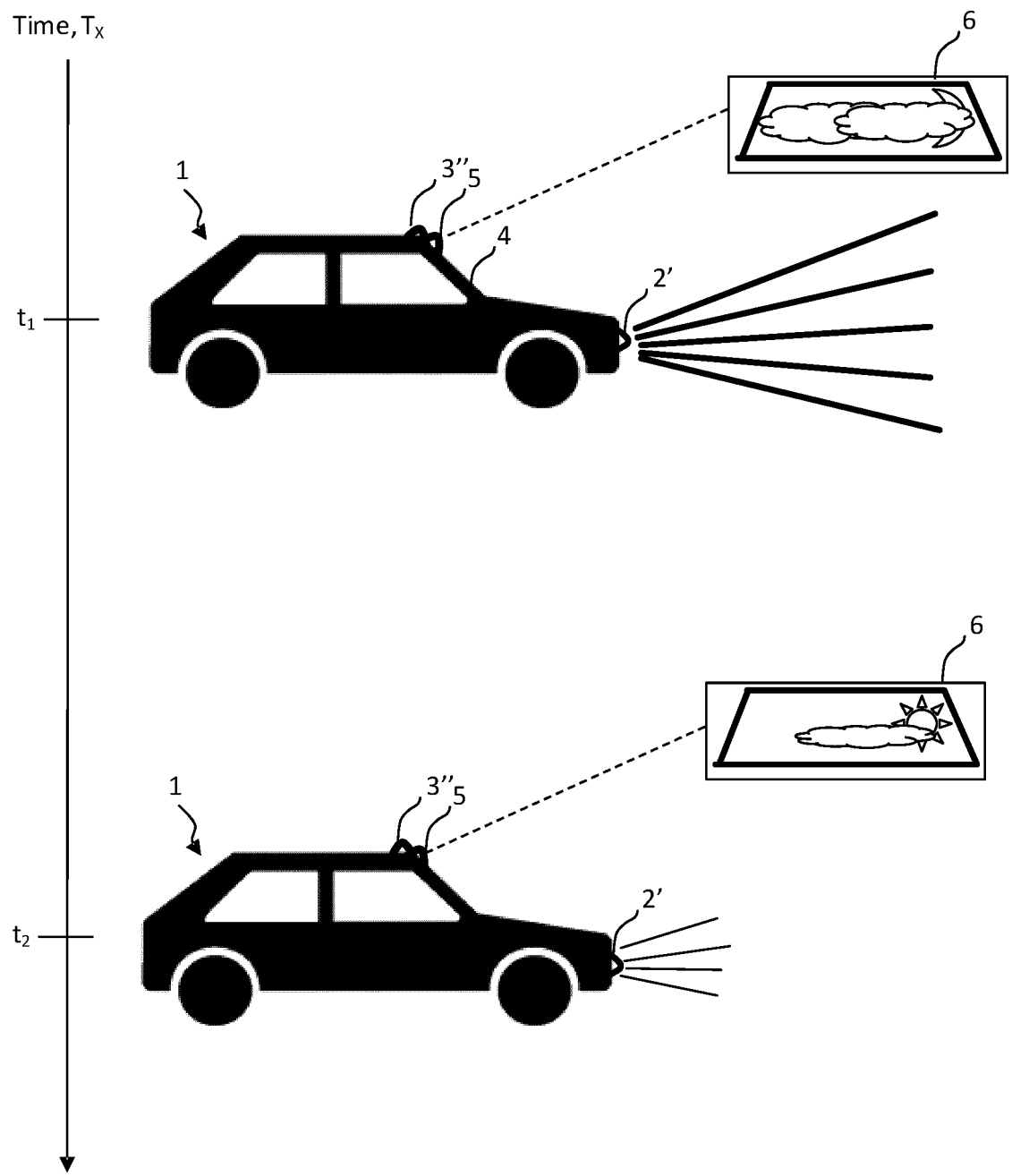
FIG. 2c depicts the time $t_1$ and $t_2$ from FIG. 2a according to one embodiment of the present disclosure where the environmental sensor is a light sensor.

FIG. 2c illustrates a vehicle 1 in accordance with another embodiment of the disclosure during a time $t_1$ and $t_2$, which may be understood as corresponding to the points in time $t_1$ and $t_2$ from FIG. 2a. During $t_1$ in FIG. 2c, an operational parameter of the headlight 2' is modified since the light sensor 3" has detected light below a certain threshold on the windshield 4 of the vehicle 1. Further, as seen in FIG. 2c the camera device 5 captures at least one image 6 of the windshield 4 at the time the light sensor 3" detects light below a certain threshold on the windshield 4 of the vehicle 1. During $t_2$ in FIG. 2c, the light sensor 3" has outputted a deactivation signal since the light captured by the light sensor 3" is above a certain threshold. Thus the operational parameter of the headlights 2' at the time $t_2$ are is modified again. Further, in accordance with the above discussed method, the camera device 5 captures at least one image 6 of the windshield 4 of the vehicle 1 during the time $t_2$. As previously mentioned, preferably a plurality of images around the times $t_1$ and $t_2$ are captured and stored for subsequent processing.

Modification of the operational parameter of the headlights 2' may for example be switching from dipped lights to daylight running lights or vice versa. This may for example be the case if the vehicle 1 is traveling on a road during day time (daylight conditions) and enters a tunnel or a parking garage whereby the headlights 2' of the vehicle 1 are switched from daylight running lights to dipped lights. Analogously, activation and deactivation of the headlights 2' may for example be switching from high beam to dipped lights and vice versa. Thus, by means of the method proposed herein it is possible to train a learning algorithm to detect conditions warranting for switching to and from high beams when the environmental conditions of the vehicle 1 warrant so, i.e. to operate as a high beam assist.

Accordingly, the user-input signal may comprise at least one of:
A first signal indicative of an activation of external lights and/or dark-mode HMI a vehicle.
A second signal indicative of a deactivation of the external lights and/or dark-mode HMI,
A third signal indicative of an increase of a sensitivity of the light sensor 3".
A fourth signal indicative of a decrease of the sensitivity of the light sensor 3".

The term "dark-mode HMI" refers to that the HMI in the vehicle switches to a specific type of interface where lightning, illumination strength and colours are adapted to make foreground content to stand out against the darker environmental conditions.

According to some embodiments, the trained learning algorithm is trained and configured to detect a presence of a plurality of environmental conditions in image data, wherein the environmental conditions are at least lighting conditions and rain. Thus, by means of the trained learning algorithm one may efficiently replace a multitude of individual sensors and provide equivalent or potentially even better functionality by means of a vehicle-mounted camera device in co-operation with the trained learning algorithm. Thereby, effectively reducing costs and complexity in manufacturing of the vehicle.

Thus, the plurality of labelled images may comprise images associated with labels indicative of a plurality of activation signals and deactivation signals outputted by a plurality of environmental sensors. Analogously, the images may further be associated with labels indicative of user-input signals indicative of overrides of the plurality of environmental sensors. In other words, the embodiments illustrated in FIGS. 2b and 2c may be combined.

Moving on, FIG. 3 illustrates a schematic block diagram representation of a system 20 for automated supervised training of a learning algorithm for detecting an environmental condition in a traffic environment. The system 10 comprises one or more processors 21, a memory 22, a sensor interface 23 and a communication interface 23. The processor(s) 21 may also be referred to as a control circuit 21 or control circuitry 21. The control circuit 21 is configured to execute instructions stored in the memory 22 to perform a method for automated supervised training of a learning algorithm for detecting an environmental condition in a traffic environment according to any one of the embodiments disclosed herein. Stated differently, the memory 22 of the system 20 can include one or more (non-transitory) computer-readable storage mediums, for storing computer-executable instructions, which, when executed by one or more computer processors 21, for example, can cause the computer processors 21 to perform the techniques described herein. The memory 22 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the system 20 comprises control circuitry 21 configured to obtain image data 6, via some communication means 23 or a communication interface 23, over a time period from a camera device 5 arranged on at least one vehicle 1. The image data 6 comprises a plurality of labelled images, at least one image of the plurality of images 6 being associated with a label indicative of at least one of:

An activation signal outputted by an environmental sensor of the at least one vehicle 1, the activation signal being indicative of a presence of an environmental condition and arranged to control an operation of a control system of the at least one vehicle 1.

A deactivation signal outputted by the environmental sensor of the at least one vehicle, the deactivation signal being indicative of an ending of the environmental condition and arranged to control the operation of the control system of the at least one vehicle.

A user-input signal outputted by a user-input device of the at least one vehicle 1, the user input-signal being indicative of an override of the activation signal or the deactivation signal of the environmental sensor of the at least one vehicle 1 and arranged to control the operation of the control system of the at least one vehicle 1.

The control circuitry 21 is further configured to train a learning algorithm based on the obtained plurality of labelled images, in order to form a trained learning algorithm configured to detect the presence of the environmental condition in image data 6.

The control circuitry 21 in said system 20 may be configured to define labels indicative of the user input signal as a supervisory signal having a higher confidence value than labels indicative of the activation signal and labels indicative of the deactivation signal when training the learning algorithm.

The environmental sensor may be a rain sensor, the environmental condition may be rain, and accordingly the control system may comprise an actuator device for actuating at least one windshield wiper apparatus of the vehicle. Thus, the user-input signal may comprise at least one of: a first signal indicative of an activation of the windshield wiper apparatus of the at least one vehicle, a second signal indicative of an deactivation of the windshield wiper apparatus of the at least one vehicle, a third signal indicative of an increase of a sensitivity of the rain sensor, and a fourth signal indicative of a decrease of the sensitivity of the rain sensor.

The control circuitry 21 may further be configured to transmit the trained learning algorithm to a plurality of vehicles 1 via some communication means 23. Each vehicle 1 is provided with a camera device 5, and the trained learning algorithm is arranged to control the operation of the control system of each vehicle 1 based on a predicted presence of the environmental condition in image data obtained from the camera device 5 of each vehicle 1. In other words, once the learning algorithm is trained to a sufficient performance level, it can effectively be deployed in a plurality of vehicles 1 by the remote entity 14.

Thus, in accordance with an aspect of the present disclosure, each vehicle 1 has a camera device 5 arranged to capture a plurality of images of a surrounding environment of the vehicle 1. Each image depicts a presence or non-presence of an environmental condition. The vehicle further comprises control circuitry 11 configured to receive a trained learning algorithm trained according to any one of the embodiments of the method for automated supervised training of a learning algorithm for detecting an environmental condition in a traffic environment disclosed herein. The control circuitry 11 of the vehicle 1 is further configured to analyse, by means of the trained learning algorithm, the plurality of images captured by the camera device 5.

The control circuitry 11 is further configured to determine, by means of the trained learning algorithm, a presence of the environmental condition in the plurality of images captured by the camera device 5 of the vehicle 1. Further, the control circuitry 11 is configured to generate, at an output, a control signal for controlling the operation of the control system of the vehicle 1 based on the determined presence of the environmental condition in the plurality of images.

As previously mentioned, in some embodiments the trained learning algorithm is configured to detect the presence of rain in the image data wherefore the control system comprises an actuator device for actuating at least one windshield wiper apparatus of the vehicle.

Thus, the training algorithm is deployed in a vehicle allowing the vehicle to operate the control system of the vehicle based on the determined/detected environmental condition of the traffic environment of the vehicle. The camera device 5 of the vehicle is preferably constantly activated at least when the vehicle is running so as to continuously monitor the traffic environment to output a control signal for controlling the operation of the control system of the vehicle in accordance with the determined presence of the environmental condition in the plurality of images captured from the camera device. In other words, the camera device 5 may be activated at least when the vehicle is running and continuously capture images during that time in order to control the operation of the control system timely and with high certainty.

Figure 4:
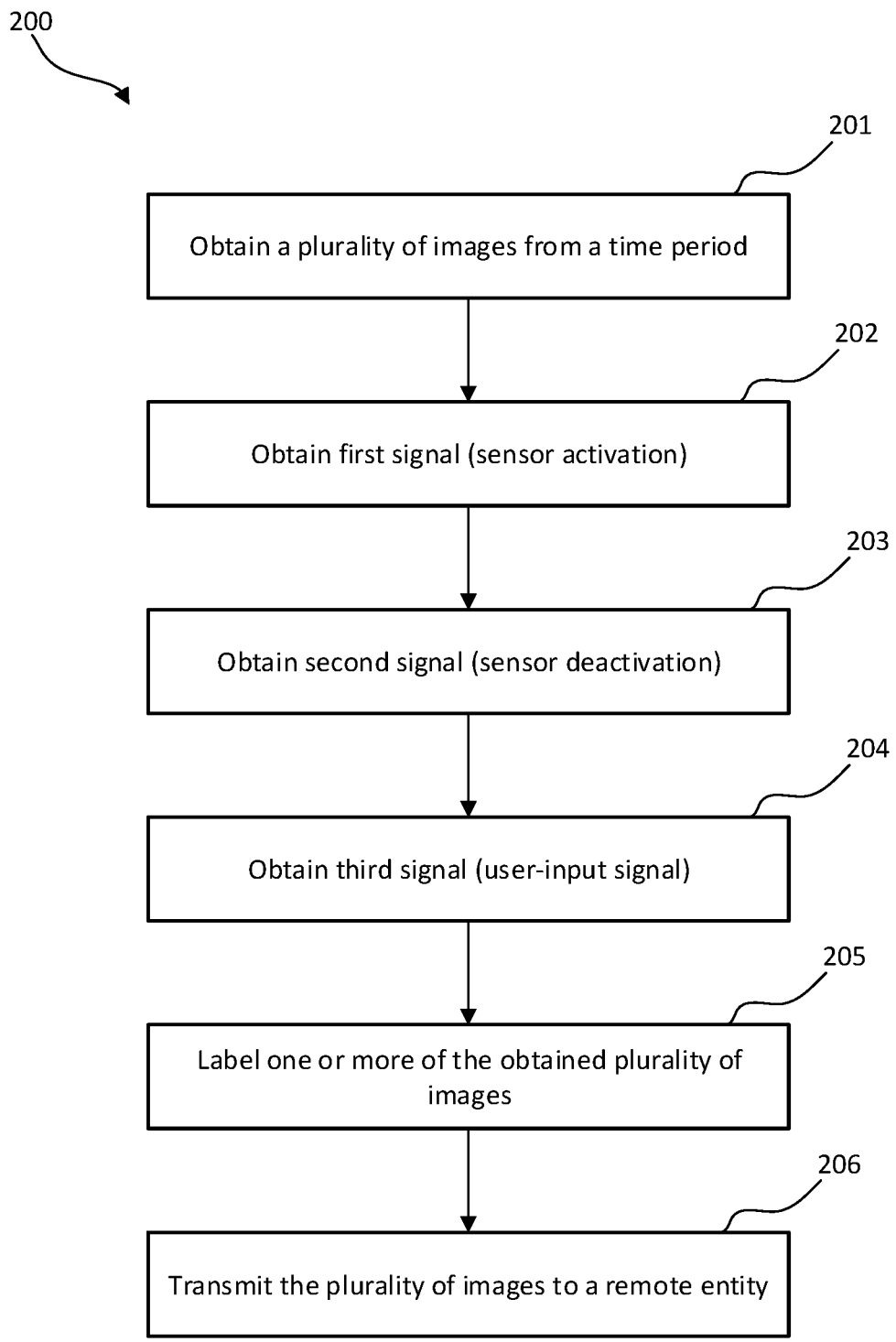
FIG. 4 is a schematic flow chart representation of a method for in-vehicle generation of training data for automated supervised training of a learning algorithm for detecting an environmental condition in a traffic environment accordance with an embodiment of the present disclosure.

FIG. 4 is a schematic flow chart representation of a method 200 for in-vehicle generation of training data for automated supervised training of a learning algorithm for detecting an environmental condition in a traffic environment. Thus, the method 200 is preferably executed run-time in a vehicle. In other words, in accordance with another aspect of the present disclosure there is provided a method 200 for generating training data to be used for the automated supervised training of the learning algorithm discussed in the foregoing. Moving on, the method 200 comprises obtaining 201 image data over a time period from a camera device arranged on a vehicle. In more detail, the image data comprising a plurality of images of a surrounding environment of the vehicle over the time period.

Further, the method 200 further comprises obtaining 202 a first signal indicative of an activation signal outputted by an environmental sensor of the vehicle during the time period. The activation signal is indicative of a presence of an environmental condition and arranged to control an operation of a control system of the vehicle. Then, a second signal is obtained 203, where the second signal is indicative of a deactivation signal outputted by the environmental sensor of the vehicle during the time period, the deactivation signal being in turn indicative of an ending of the environmental condition and arranged to control the operation of the control system of the vehicle. The method 200 further comprises obtaining 204 a third signal indicative of a user-input signal outputted by a user-input device of the vehicle during the time period. The user input-signal is indicative of an override of the activation signal or the deactivation signal of the environmental sensor of the at least one vehicle and arranged to control the operation of the control system of the at least one vehicle.

Further, the method 200 comprises labelling 205 at least one of the plurality of images 6 based on a timing of the activation signal, deactivation signal, and the user-input signal over the time period. Furthermore, the method 200 comprises transmitting 206 the plurality of images to a remote entity, the plurality of images forming training data for a learning algorithm configured to detect the presence of the environmental condition in image data.

The method 200 as described with reference to FIG. 4 allows for an efficient and automated generation of training data which may further be sent 203 to a remote entity such as a system 20 (illustrated in FIG. 3) for the automated supervised training of a learning algorithm. The remote entity may be a cloud computing system or any other suitable system for supervised training of a learning algorithm.

Figure 5:
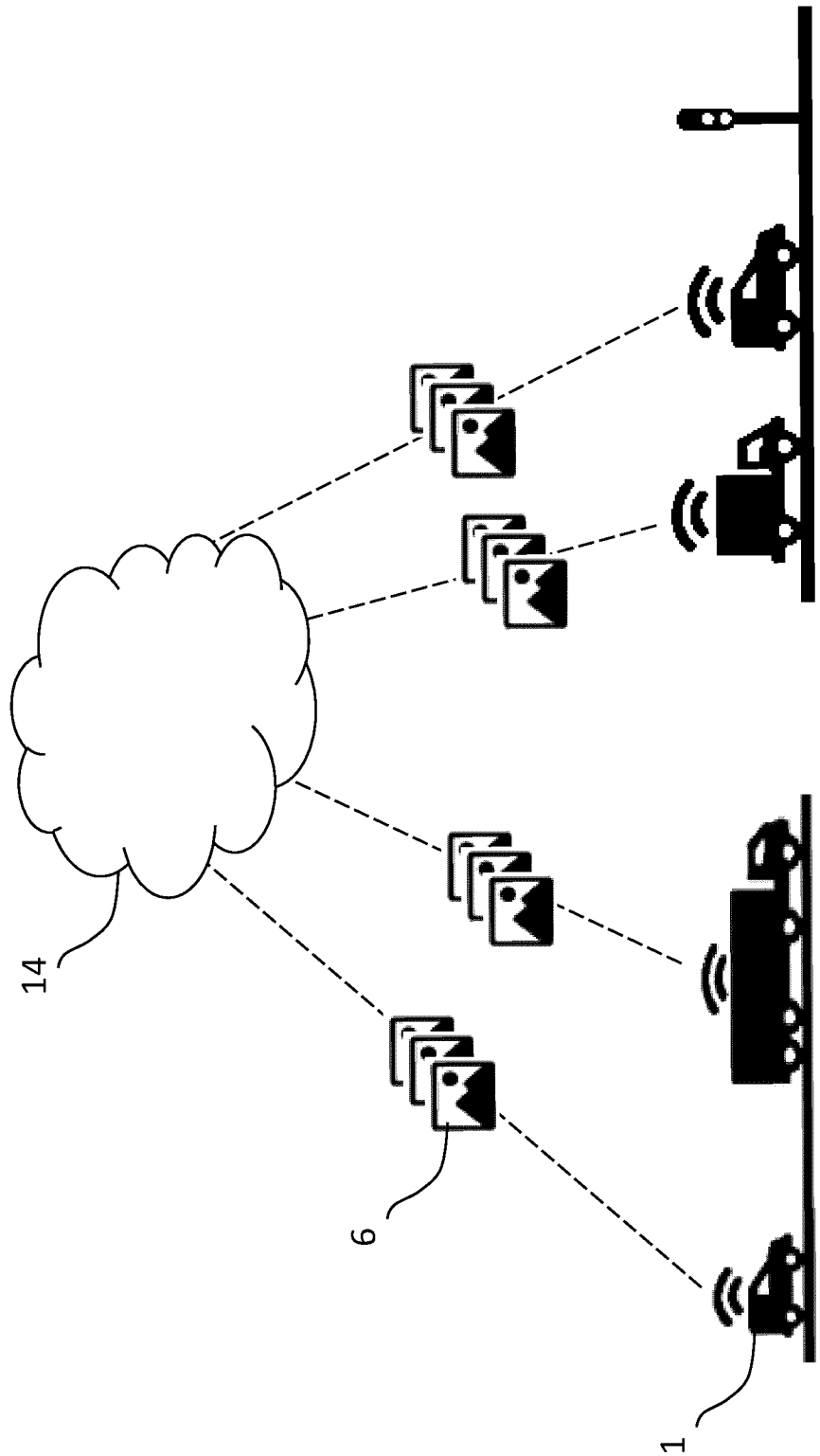
FIG. 5 depicts a plurality of vehicles generating training data and transmitting the training data to a remote entity configured for automated supervised training of a learning algorithm for detecting an environmental condition in a traffic environment in accordance with an embodiment of the present disclosure.

FIG. 5 illustrates a remote entity 14 that receives training data from a plurality of vehicles 1 with different geographical locations (denoted as A and B). The remote entity 14 may be in the form of a cloud computing system. Thus as seen in FIG. 5, the method for in-vehicle generation of training data for automated supervised training of a learning algorithm for detecting an environmental condition in a traffic environment may simultaneously be implemented in a plurality of vehicles 1 in different geographical locations, with different vehicle characteristics, such that a large amount of training data is generated. The large amount of training data may then further be utilized by the remote central entity 14 in order to execute the method for automated supervised training of a learning algorithm for detecting an environmental condition in a traffic environment as discussed in the foregoing.

Figure 6:
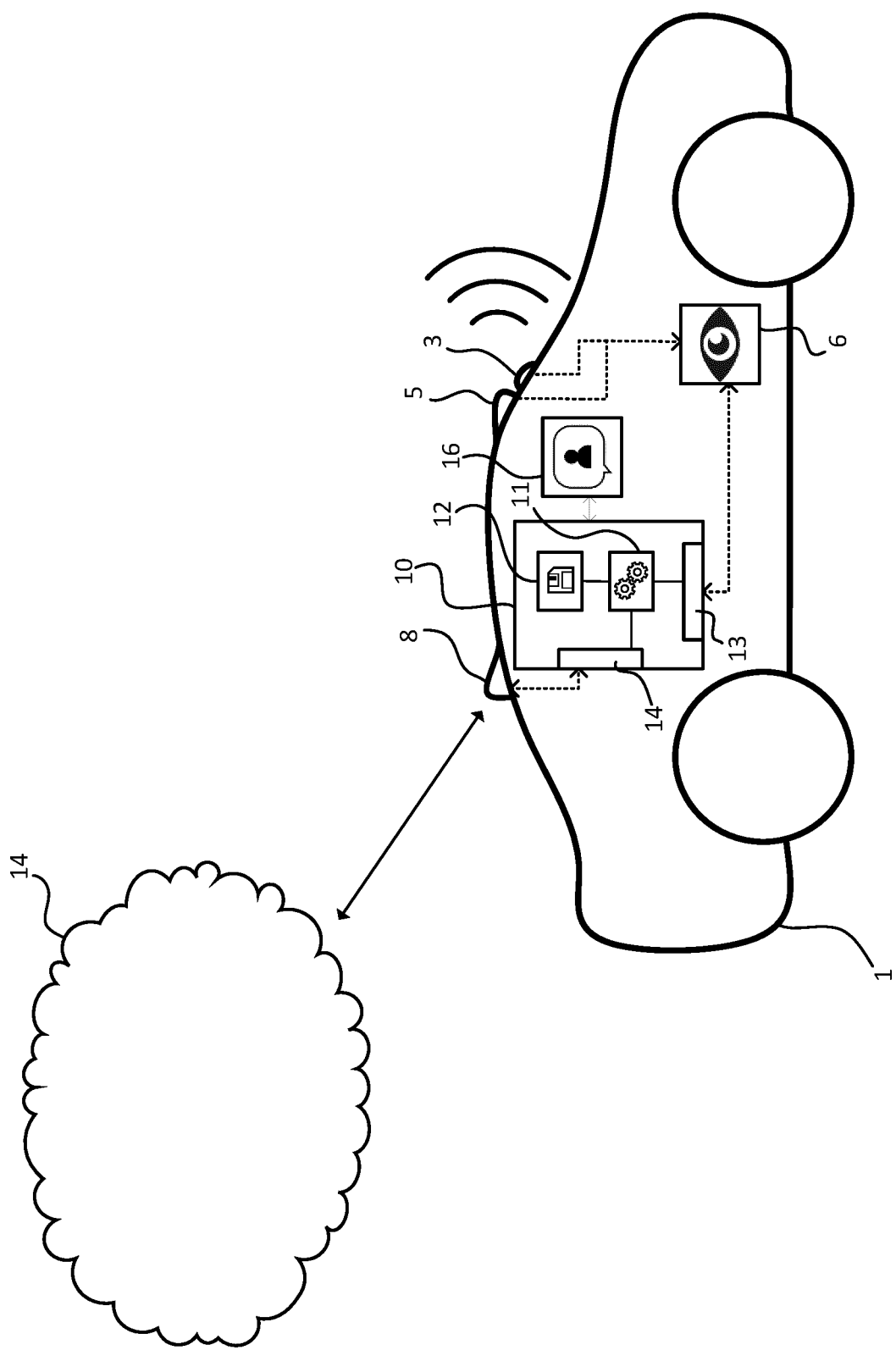
FIG. 6 depicts a side-view of a vehicle in accordance with an embodiment of the present disclosure.

FIG. 6 is a schematic side view illustration of a vehicle 1 having a system 10 for in-vehicle generation of training data for automated supervised training of a learning algorithm for detecting an environmental condition in a traffic environment. The vehicle 1 further comprises a perception system 6. A perception system 6 is in the present context to be understood as a system responsible for acquiring raw sensor data from on sensors 3, 5 such as cameras, LIDARs and RADARs, ultrasonic sensors, and converting this raw data into scene understanding.

The system 10 comprises one or more processors 11, a memory 12, a sensor interface 13 and a communication interface 14. The processor(s) 11 may also be referred to as a control circuit 11 or control circuitry 11. The control circuit 11 is configured to execute instructions stored in the memory 12 to perform a method for in-vehicle generation of training data for automated supervised training of a learning algorithm for detecting an environmental condition in a traffic environment according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the vehicle 1 comprises a camera device 5 arranged to generate a plurality of images of a surrounding environment of the vehicle 1 over a time period. The vehicle 1 further comprises an environmental sensor 3 configured to detect a presence of an environmental condition and to generate an activation signal and a deactivation signal to a control system of the vehicle 1. The vehicle further comprises a user-input device 16 configured to generate a user-input signal to the control system of the vehicle. Furthermore, the system 10 comprises control circuitry 11 configured to label at least one of the plurality of images based on a timing of the activation signal, deactivation signal, and the user-input signal over the time period. The vehicle 1 is configured to transmit the plurality of images to a remote entity 14. The plurality of images forming training data for a learning algorithm configured to predict the presence of the environmental condition in image data.

Further, the vehicle 1 may be connected to external network(s) or remote entities 14 via for instance a wireless link (e.g. for transmitting image data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) or control circuitry 11, 21 may be or include any number of hardware components for conducting data or signal processing or for executing computer code stored in memory 12, 22. The systems 10, 20 disclosed herein, each has an associated memory 12, 22 and the memory 12, 22 may be one or more devices for storing data and/or computer code for completing or facilitating the various methods described in the present description. The memory may include volatile memory or non-volatile memory. The memory 12, 22 may include database components, object code components, script components, or any other type of information structure for supporting the various activities of the present description. According to an exemplary embodiment, any distributed or local memory device may be utilized with the systems and methods of this description. According to an exemplary embodiment the memory 12, 22 is communicably connected to the processor 11, 21 (e.g., via a circuit or any other wired, wireless, or network connection) and includes computer code for executing one or more processes described herein.

It should be appreciated that the sensor interface 14 may also provide the possibility to acquire sensor data directly or via dedicated sensor control circuitry 6 in the vehicle. The communication/antenna interface 14 may further provide the possibility to send output and receive input to/from a remote location (e.g. remote server) by means of the antenna 8. Moreover, some sensors in the vehicle may communicate with the system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method for automated supervised training of a learning algorithm for detecting an environmental condition in a traffic environment, the method comprising:
obtaining image data over a time period originating from a camera device arranged on at least one vehicle;
wherein the obtained image data comprises a plurality of labelled images, wherein the plurality of labelled images having labels indicative of:
an activation signal outputted by an environmental sensor of the at least one vehicle, the activation signal being indicative of a presence of an environmental condition and arranged to control an operation of a control system of the at least one vehicle,
a deactivation signal outputted by the environmental sensor of the at least one vehicle, the deactivation signal being indicative of an ending of the environmental condition and arranged to control the operation of the control system of the at least one vehicle, and
a user-input signal outputted by a user-input device of the at least one vehicle, the user input-signal being indicative of an override of the activation signal or the deactivation signal of the environmental sensor of the at least one vehicle and arranged to control the operation of the control system of the at least one vehicle; and
training a learning algorithm based on the obtained plurality of labelled images, in order to form a trained learning algorithm configured to predict the presence of the environmental condition in the obtained image data.

2. The method according to claim 1, wherein the training comprises defining labels indicative of the user input signal as a supervisory signal having a higher confidence value than labels indicative of the activation signal and labels indicative of the deactivation signal.

3. The method according to claim 1, wherein the environmental sensor is a rain sensor, the environmental condition is rain, and the control system comprises an actuator device for actuating at least one windshield wiper apparatus of the at least one vehicle.

4. The method according to claim 3, wherein the user-input signal comprises at least one of:
a first signal indicative of an activation of the windshield wiper apparatus of the at least one vehicle;
a second signal indicative of an deactivation of the windshield wiper apparatus of the at least one vehicle;

a third signal indicative of an increase of a sensitivity of the rain sensor; and a fourth signal indicative of a decrease of the sensitivity of the rain sensor.

5. The method according to claim 1, further comprising:
transmitting the trained learning algorithm to a plurality of vehicles, each vehicle having a camera device, wherein the trained learning algorithm is arranged to control the operation of the control system of each vehicle based on a predicted presence of the environmental condition in image data obtained from the camera device of each vehicle.

6. A non-transitory computer-readable storage medium storing one or more programs configured to be executed by one or more processors of a processing system, the one or more programs comprising instructions for performing the method according to claim 1.

7. A vehicle comprising:
a camera device arranged to capture a plurality of images of a surrounding environment of the vehicle, each image depicting a presence or non-presence of an environmental condition; and
a control circuitry configured to:
receive a trained learning algorithm trained according to a method of claim 1;
analyze, based on the received trained learning algorithm, the plurality of images captured by the camera device;
determine, based on the received trained learning algorithm, a presence of the environmental condition in the plurality of images captured by the camera device of each vehicle;
generate, at an output, a control signal for controlling the operation of a control system of the vehicle based on the determined presence of the environmental condition in the plurality of images.

8. A system for automated supervised training of a learning algorithm for detecting an environmental condition in a traffic environment, the system comprising:
a control circuitry configured to:
obtain image data over a time period originating from a camera device arranged on at least one vehicle;
wherein the obtained image data comprises a plurality of labelled images, wherein the plurality of labelled images having labels indicative of:
an activation signal outputted by an environmental sensor of the at least one vehicle, the activation signal being indicative of a presence of an environmental condition and arranged to control an operation of a control system of the at least one vehicle,
a deactivation signal outputted by the environmental sensor of the at least one vehicle, the deactivation signal being indicative of an ending of the environmental condition and arranged to control the operation of the control system of the at least one vehicle, and
a user-input signal outputted by a user-input device of the at least one vehicle, the user input-signal being indicative of an override of the activation signal or the deactivation signal of the environmental sensor of the at least one vehicle and arranged to control the operation of the control system of the at least one vehicle; and
train a learning algorithm based on the obtained plurality of labelled images, in order to form a trained learning algorithm configured to predict the presence of the environmental condition in the obtained image data.

9. The system according to claim 8, wherein the control circuitry is configured to define labels indicative of the user-input signal as a supervisory signal having a higher confidence value than labels indicative of the activation signal and labels indicative of the deactivation signal when training the learning algorithm.

10. The system according to claim 8, wherein the environmental sensor is a rain sensor, the environmental condition is rain, and wherein the control system comprises an actuator device for actuating at least one windshield wiper apparatus of the vehicle.

11. The system according to claim 10, wherein the user-input signal comprises at least one of:
a first signal indicative of an activation of the windshield wiper apparatus of the at least one vehicle;
a second signal indicative of an deactivation of the windshield wiper apparatus of the at least one vehicle;
a third signal indicative of an increase of a sensitivity of the rain sensor; and
a fourth signal indicative of a decrease of the sensitivity of the rain sensor.

12. The system according to claim 8, wherein the control circuitry is further configured to:
transmit the trained learning algorithm to a plurality of vehicles, each vehicle having a camera device, wherein the trained learning algorithm is arranged to control the operation of the control system of each vehicle based on a predicted presence of the environmental condition in image data obtained from the camera device of each vehicle.

13. A method for in-vehicle generation of training data for automated supervised training of a learning algorithm for detecting an environmental condition in a traffic environment, the method comprising:
obtaining image data over a time period from a camera device arranged on a vehicle, the obtained image data comprising a plurality of images of a surrounding environment of the vehicle over the time period;
obtaining a first signal indicative of an activation signal outputted by an environmental sensor of the vehicle during the time period, the activation signal being indicative of a presence of an environmental condition and arranged to control an operation of a control system of the vehicle;
obtaining a second signal indicative of a deactivation signal outputted by the environmental sensor of the vehicle during the time period, the deactivation signal being indicative of an ending of the environmental condition and arranged to control the operation of the control system of the vehicle;
obtaining a third signal indicative of a user-input signal outputted by a user-input device of the vehicle during the time period, the user input-signal being indicative of an override of the activation signal or the deactivation signal of the environmental sensor of the at least one vehicle and arranged to control the operation of the control system of the at least one vehicle; and
transmitting a set of the plurality of images to a remote entity, the set of images being associated with timings of the activation signal, deactivation signal, and the user-input signal over the time period.

14. The method according to claim 13, wherein the environmental sensor is a rain sensor, the environmental condition is rain, and the control system comprises an actuator device for actuating at least one windshield wiper apparatus of the at least one vehicle.

15. The method according to claim 14, wherein the user-input signal comprises at least one of:

a first user-input signal indicative of an activation of the windshield wiper apparatus of the at least one vehicle;

a second user-input signal indicative of an deactivation of the windshield wiper apparatus of the at least one vehicle;

a third user-input signal indicative of an increase of a sensitivity of the rain sensor; and a fourth user-input signal indicative of a decrease of the sensitivity of the rain sensor.

16. A non-transitory computer-readable storage medium storing one or more programs configured to be executed by one or more processors of a vehicle control system, the one or more programs comprising instructions for performing the method according to claim 13.

17. A system for in-vehicle generation of training data for automated supervised training of a learning algorithm for detecting an environmental condition in a traffic environment, the system comprising:

a control circuitry configured to:

obtain image data over a time period from a camera device arranged on a vehicle, the obtained image data comprising a plurality of images of a surrounding environment of the vehicle over the time period;

obtain a first signal indicative of an activation signal outputted by an environmental sensor of the vehicle during the time period, the activation signal being indicative of a presence of an environmental condition and arranged to control an operation of a control system of the vehicle;

obtain a second signal indicative of a deactivation signal outputted by the environmental sensor of the vehicle during the time period, the deactivation signal being indicative of an ending of the environmental condition and arranged to control the operation of the control system of the vehicle;

obtain a third signal indicative of a user-input signal outputted by a user-input device of the vehicle during the time period, the user input-signal being indicative of an override of the activation signal or the deactivation signal of the environmental sensor of the at least one vehicle and arranged to control the operation of the control system of the at least one vehicle; and transmit a set of the plurality of images to a remote entity, the set of images being associated with timings of the activation signal, deactivation signal, and the user-input signal over the time period.

18. The system according to claim 17, wherein the environmental sensor is a rain sensor, the environmental condition is rain, and the control system comprises an actuator device for actuating at least one windshield wiper apparatus of the at least one vehicle.

19. The system according to claim 18, wherein the user-input signal comprises at least one of:

a first user-input signal indicative of an activation of the windshield wiper apparatus of the at least one vehicle;

a second user-input signal indicative of an deactivation of the windshield wiper apparatus of the at least one vehicle;

a third user-input signal indicative of an increase of a sensitivity of the rain sensor; and a fourth user-input signal indicative of a decrease of the sensitivity of the rain sensor.

* * * * *